(12) United States Patent
Motebennur et al.

(10) Patent No.: US 8,042,817 B2
(45) Date of Patent: Oct. 25, 2011

(54) ADJUSTABLE HEIGHT DEVICE FOR HIGH CLEARANCE VEHICLE

(75) Inventors: Vijay W. Motebennur, Jackson, MN (US); James Slawson, Spirit Lake, IA (US); John Buchena, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 41 days.

(21) Appl. No.: 12/645,015

(22) Filed: Dec. 22, 2009

(65) Prior Publication Data

US 2011/0148053 A1 Jun. 23, 2011

(51) Int. Cl.
B60G 17/04 (2006.01)
(52) U.S. Cl. .............. 280/5.514; 280/6.154; 280/6.157; 280/93.512
(58) Field of Classification Search .............. 280/5.514, 280/6.154, 6.157, 89.1, 93.51, 93.512
See application file for complete search history.

(56) References Cited

U.S. PATENT DOCUMENTS

| 5,039,129 | A | 8/1991 | Balmer |
| 6,021,861 | A | 2/2000 | Dickson |
| 6,036,206 | A | 3/2000 | Bastin et al. |
| 6,257,361 | B1 | 7/2001 | Dickson |
| 6,454,294 | B1 * | 9/2002 | Bittner et al. ............... 280/677 |
| 6,616,156 | B1 * | 9/2003 | Dudding et al. ......... 280/93.512 |
| 6,758,535 | B2 * | 7/2004 | Smith ........................... 301/128 |
| 7,296,810 | B2 * | 11/2007 | Thannikary et al. ......... 280/93.5 |
| 7,543,831 | B2 * | 6/2009 | Pope et al. .................. 280/93.5 |
| 2003/0020323 | A1 * | 1/2003 | Smith ....................... 301/124.1 |

OTHER PUBLICATIONS

John Deere, John Deere Releases New High-Clearance Bundle For Sprayers (downloaded Apr. 8, 2009) at http://www.deere.com/en—US/newsroom/2009/releases/agricultural/.
John Deere, High Clearance Option (dated Jan. 5, 2009) at http://www.deere.com.
PCT International Search Report for International Application No. PCT/IB2010/003290 Dated Mar. 25, 2011.

* cited by examiner

Primary Examiner — Toan C To

(57) ABSTRACT

A self-propelled, dirigible agricultural vehicle includes a height-adjustable chassis with an axle and a driven wheel hub. The axle is shiftable between a normal clearance position above the wheel hub and a relatively higher elevated clearance position. The chassis further includes a kingpin and a spacer section that is removably connectable to the kingpin. The axle is in the normal clearance position when the spacer is removed from the kingpin and is in the elevated clearance position when the spacer is connected to the kingpin.

19 Claims, 13 Drawing Sheets

US 8,042,817 B2

ADJUSTABLE HEIGHT DEVICE FOR HIGH CLEARANCE VEHICLE

BACKGROUND

1. Field

The present invention relates generally to agricultural vehicles. More specifically, embodiments of the present invention concern an agricultural applicator with a height-adjustable chassis.

2. Discussion of Prior Art

Conventional agricultural applicators are used to spread agricultural materials (e.g., chemicals) along a field in liquid or solid form. Known applicators comprise a self-powered vehicle that includes a chassis with axles and multiple wheels, with the axles being spaced above the rotational axis of the wheels so that the axles present an elevated axle clearance above the ground. Consequently, known applicators are operable to traverse a crop field while much of the chassis is limited from brushing, trampling, or otherwise harmfully contacting the crop.

However, prior art agricultural applicators are deficient and suffer from certain limitations. For example, prior art applicators do not present suitable ground clearance for all types of crops. In particular, prior art applicators fail to provide sufficient ground clearance for certain crops throughout the growing season, such as when those crops are late in the growing season. Furthermore, conventional applicators with a relatively high ground clearance are unable to be moved into and out many conventionally-sized commercial buildings for maintenance or storage.

SUMMARY

The following brief summary is provided to indicate the nature of the subject matter disclosed herein. While certain aspects of the present invention are described below, the summary is not intended to limit the scope of the present invention.

Embodiments of the present invention provide an agricultural vehicle that does not suffer from the problems and limitations of the prior art applicators set forth above.

A first aspect of the present invention concerns a self-propelled, dirigible agricultural vehicle with a height-adjustable chassis that broadly includes an axle, a driven wheel hub, a kingpin, a steering mechanism, and a spacer section. The axle is shiftable between a normal clearance position above the wheel hub and a relatively higher elevated clearance position. The kingpin presents opposite upper and lower ends. The kingpin is attached relative to the wheel hub adjacent the lower end. The kingpin is attached relative to the axle adjacent the upper end. The kingpin is rotatable relative to the axle about an upright kingpin axis so that the wheel hub swings as the kingpin rotates. The steering mechanism is coupled between the axle and wheel hub to effect swinging of the wheel hub. The spacer section is removably connectable to the kingpin between the axle and the wheel hub, with the axle being in the normal clearance position when the spacer is removed and in the elevated clearance position when the spacer is connected between the axle and the wheel hub, and with the steering mechanism being operable to swing the wheel hub when the axle is in either of the positions.

A second aspect of the present invention concerns an axle pivot kit operable to adjust the clearance between an axle and a driven wheel hub of a chassis of a self-propelled, dirigible agricultural vehicle, with the chassis including a removable original equipment kingpin pivotally mounted within a portion of the axle to maintain the axle in a normal clearance position above the wheel hub and further including a steering mechanism coupled between the axle and wheel hub to effect swinging of the wheel hub. The kit broadly includes a replacement kingpin and a spacer section. The replacement kingpin presents opposite upper and lower ends, with the replacement kingpin operable to be attached relative to the wheel hub adjacent the lower end and operable to be attached relative to the axle adjacent the upper end. The replacement kingpin serves to replace the original equipment kingpin once the latter is removed, and is relatively longer than the original equipment kingpin. The replacement kingpin is rotatable relative to the axle about an upright kingpin axis so that the wheel hub swings as the replacement kingpin rotates. The spacer section is removably connectable to the replacement kingpin between the axle and the wheel hub. The spacer section is removably coupled to the kingpin above the lower end and operable to engage the axle to locate the axle in an elevated clearance position, with the steering mechanism being operable to swing the wheel hub in either of the positions.

A third aspect of the present invention concerns a method of adjusting the clearance between an axle and a driven wheel hub of a chassis of a self-propelled, dirigible agricultural vehicle, with the chassis including a removable original equipment kingpin attached relative to an axle housing and the wheel hub and being rotatable about an upright kingpin axis so that the wheel hub swings as the kingpin rotates, and with the original equipment kingpin maintaining the axle in a normal clearance position above the wheel hub. The method broadly includes the steps of inserting a replacement kingpin in the place of the original equipment kingpin between the axle and wheel hub along the kingpin axis; and mounting a spacer section into engagement with the axle housing, with the spacer section maintaining the axle in an elevated clearance position located above the normal clearance position.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 1:
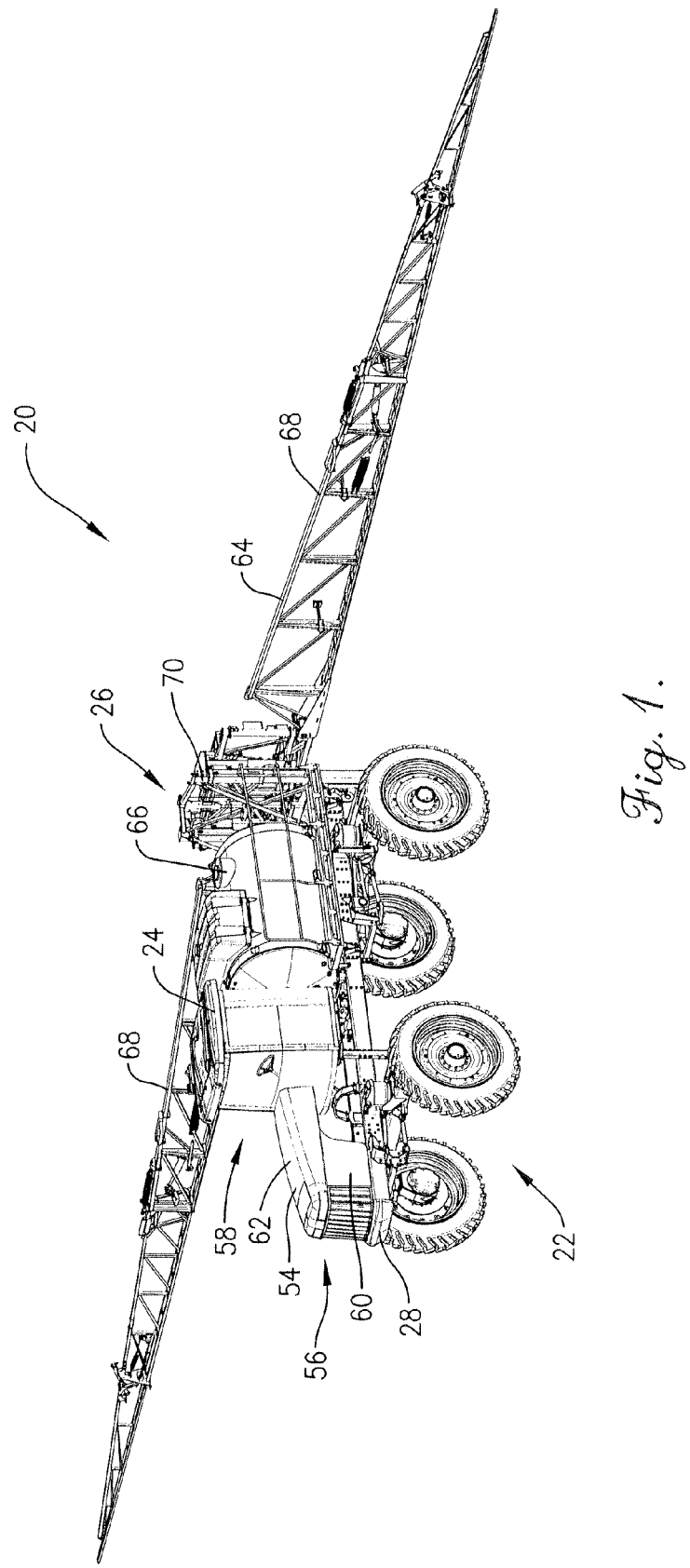
FIG. 1 is a front perspective of a dirigible agricultural applicator constructed in accordance with a preferred embodiment of the present invention and showing a rolling chassis, cab, hood, and sprayer assembly of the applicator.
Figure 2:
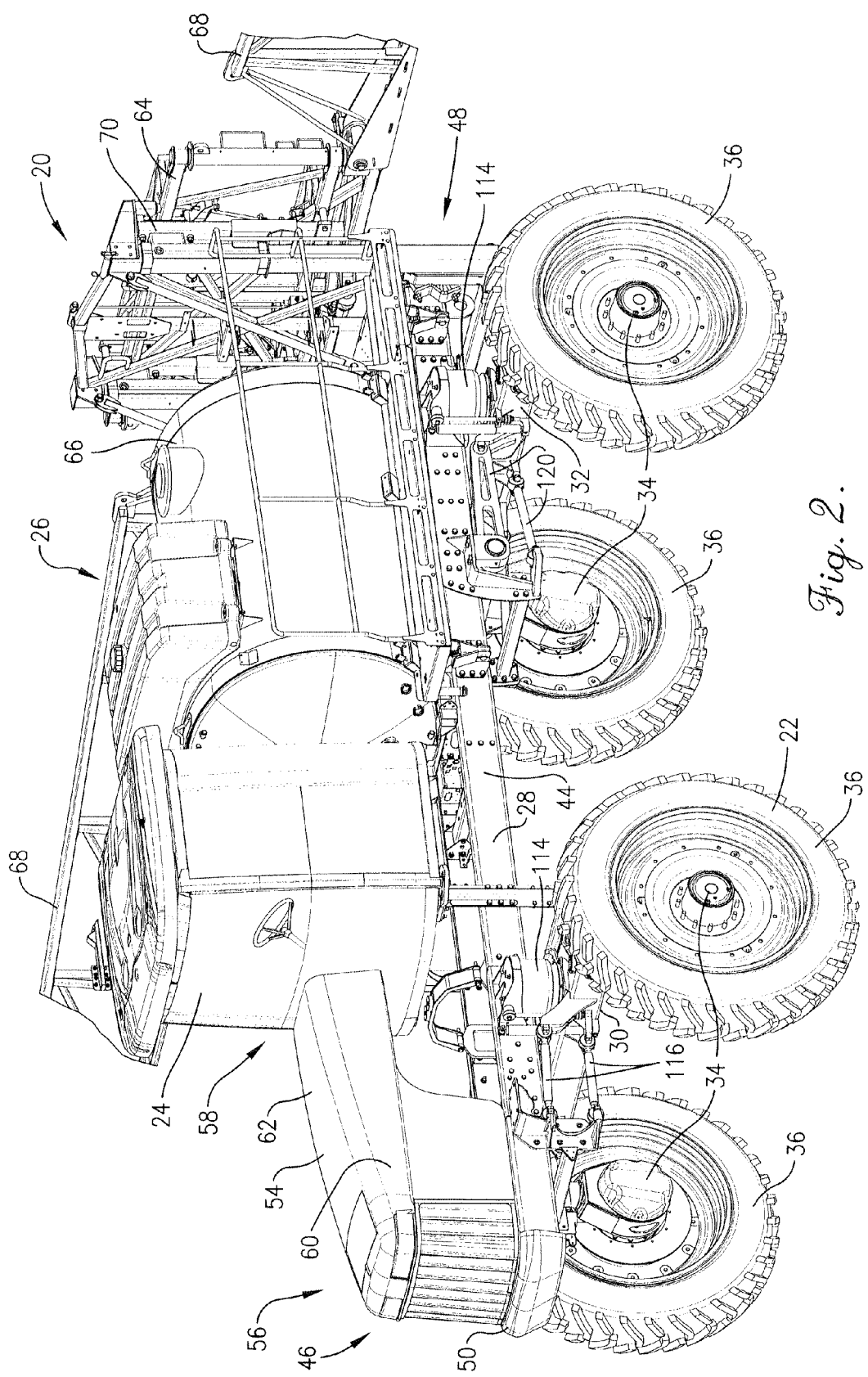
FIG. 2 is a fragmentary front perspective of the applicator shown in FIG. 1, with the rolling chassis including, among other things, a frame, front and rear telescopic axle assemblies, wheel hubs mounted on the axle assemblies, and wheels, with the rolling chassis in a standard clearance configuration and axle assemblies in a corresponding standard clearance position.
Figure 3:
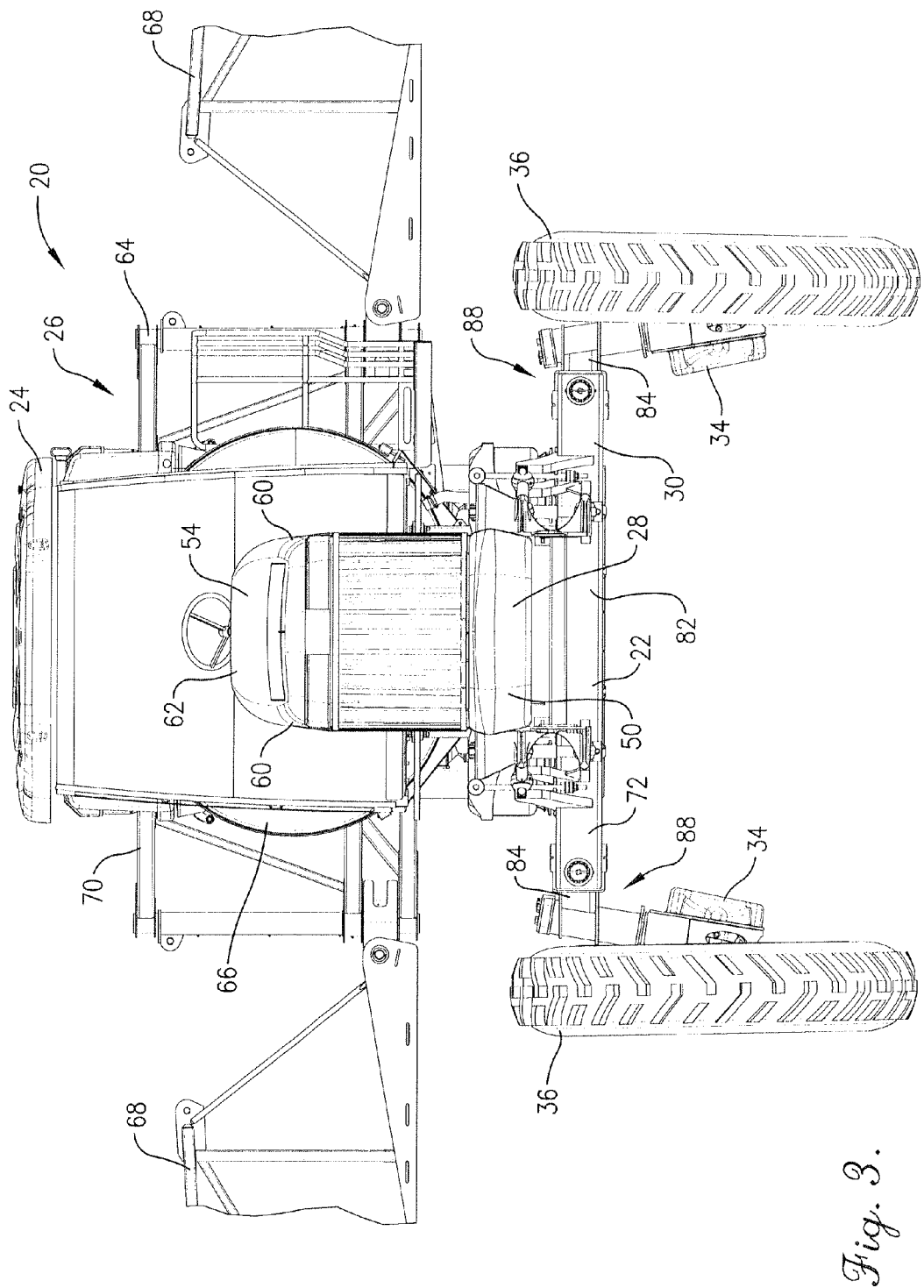
FIG. 3 is a fragmentary front elevation of the applicator shown in FIGS. 1 and 2, showing end sections of the axle telescopically received in a central section of the axle, with the rolling chassis in the standard clearance configuration and the end axle sections shifted inwardly so that the axle assemblies are in a laterally inner axle position.
Figure 13A:
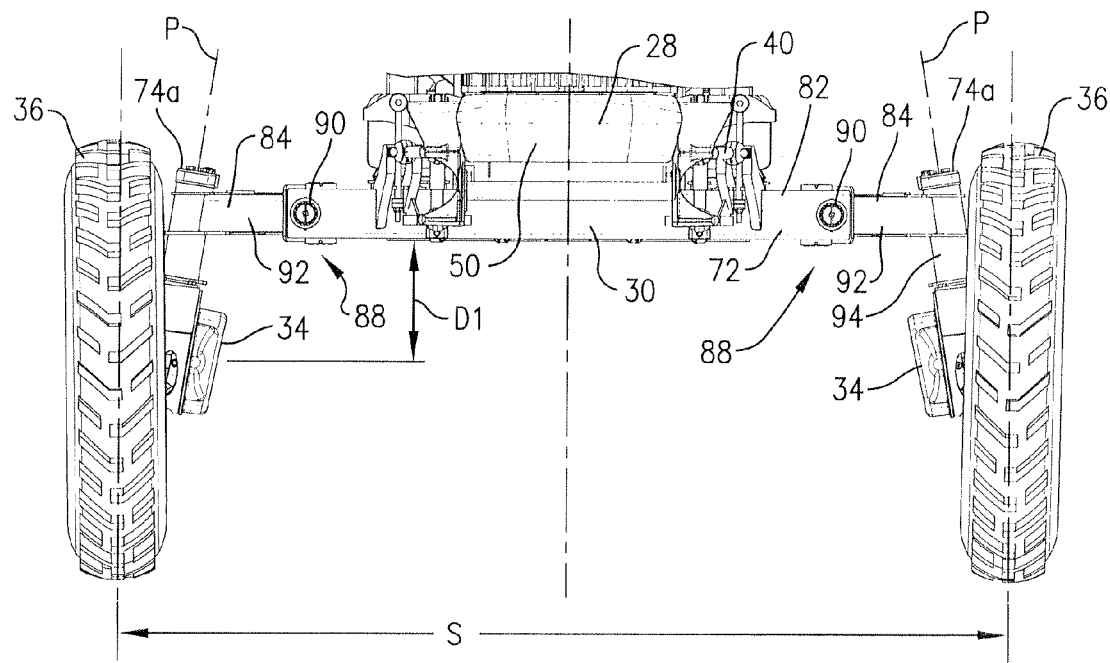
Figure 13B:
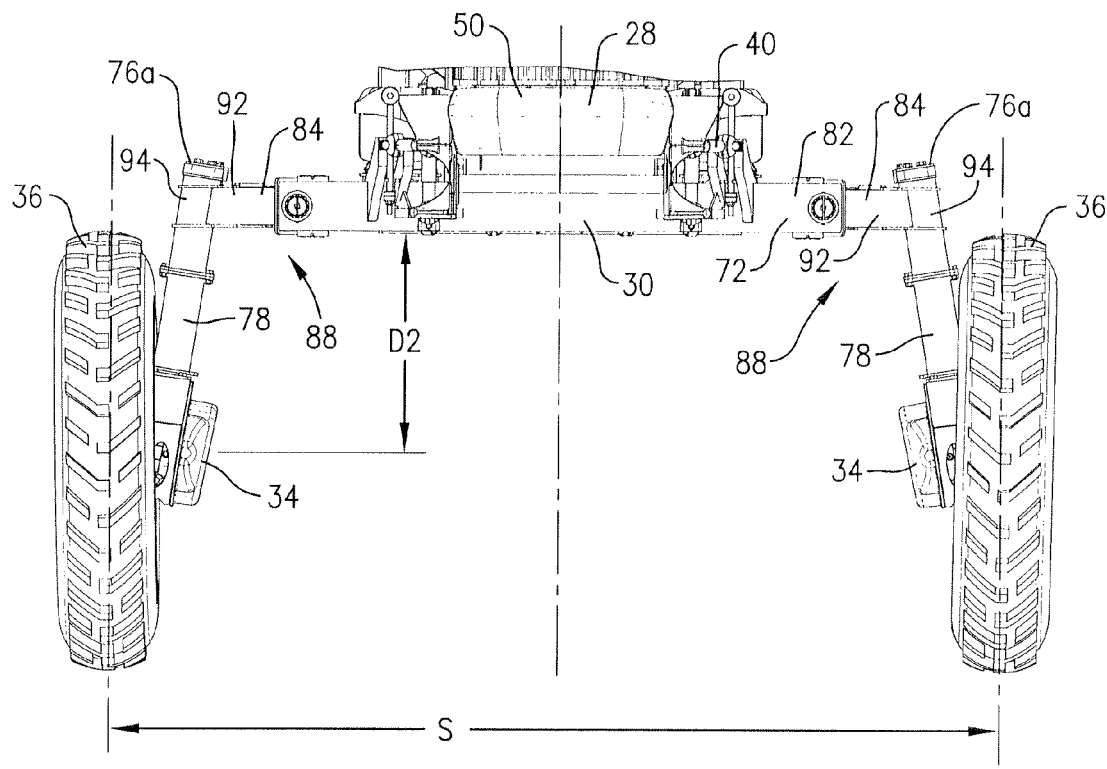

FIG. 13a is a fragmentary front elevation of the applicator shown in FIGS. 1-3, showing the rolling chassis in the standard clearance configuration and the front axle assembly in an intermediate axle position to define a wheel spacing between the wheels mounted to the front axle assembly; and FIG. 13b is a fragmentary front elevation of the applicator shown in FIG. 13a, showing the rolling chassis in the elevated clearance configuration and the end sections of the front axle assembly shifted laterally inwardly from the intermediate axle position to present substantially the same wheel spacing as shown in FIG. 13a.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

Turning initially to FIGS. 1-3, a self-propelled, dirigible agricultural applicator 20 is preferably operable to travel along a field to apply chemicals to a crop. However, the principles of the present invention are applicable where the applicator 20 is used for other agricultural applications, e.g., towing an implement through a row crop field. As will be discussed in greater detail, the applicator 20 is preferably operable to be shifted between a standard clearance configuration and an elevated clearance configuration while maintaining a predetermined lateral wheel spacing. The illustrated applicator 20 broadly includes a rolling chassis 22, cab 24, an engine (not shown), and a sprayer assembly 26.

Turning now to FIGS. 2-9, the rolling chassis 22 broadly includes, among other things, a ladder frame 28, front and rear axle assemblies 30,32, driven wheel hub assemblies 34, wheels 36, steering assembly 38, and front and rear suspensions 40,42. The ladder frame 28 preferably comprises a substantially a rigid platform for supporting the cab 24, engine, and sprayer assembly 26. However, it is also within the scope of the present invention where frame 28 supports other equipment or structures associated with applicator 20. In the illustrated embodiment, the frame 28 is elongated and includes frame rails 44 that extend between fore and aft ends 46,48 of the frame 28. Furthermore, the frame 28 includes a front end section 50 attached to the rails 44 at the fore end 46 and a plurality of stiffeners 52 that are attached to rails 44 and are spaced longitudinally between the fore and aft ends 46,48 (see FIG. 5). As will be discussed, the frame 28 is connected to axle assemblies 30,32 by corresponding suspensions 40,42.

Turning to FIGS. 1-3 a hood 54 is mounted adjacent the fore end 46 of the frame 28. The hood 54 presents an engine compartment (not shown) that receives the engine in the usual manner. Hood 54 presents front and rear ends 56,58 with side portions 60 and top portion 62 extending between ends 56,58. Cab 24 is conventional and is mounted rearwardly of the hood 54 to provide a location for the operator to observe and control applicator 20. It is also within the scope of the present invention where cab 24 and engine are alternatively positioned on ladder frame 28.

The illustrated sprayer assembly 26 is conventional and is preferably operable to apply chemical in liquid form. However, the principles of the present invention are applicable where another applicator 20 is operably supported on the rolling chassis 22. For example, the applicator 20 could include a granular material spreader. The illustrated sprayer assembly 26 preferably includes a boom assembly 64 and a liquid container 66. The boom assembly 64 includes boom 68 and boom support 70 for adjustably positioning boom 68. It is also within the scope of the present invention where sprayer assembly 26 is alternatively configured for chemical sprayer operations. For example, features of another preferred tilting boom sprayer are disclosed in U.S. application Ser. No. 12/636,455, filed Dec. 11, 2009, entitled APPLICATOR BOOM TILT FRAME, assigned of record to the assignee of the present invention, which is hereby incorporated in its entirety by reference herein.

Turning to FIGS. 4-9, the ladder frame 28 is supported by axle assemblies 30,32 that preferably permit adjustment of axle width and axle height relative to wheel hub assemblies 34. Front axle assembly 30 broadly includes a telescopic axle 72, removable standard and elongated kingpins 74a,76a, and spacer sleeves 78 (see FIGS. 9 and 12). Rear axle assembly 32 is similarly constructed and includes a telescopic axle 80, standard and elongated kingpins 74b,76b that are substantially identical to kingpins 74a,76a, and spacer sleeves 78. As will be discussed in greater detail, the kingpins 74,76 and spacer sleeves 78 are selectively installed to adjust the height of chassis 22 between standard and elevated clearance configurations.

The axles 72,80 are preferably constructed to be adjustable in width. The front telescopic axle 72 preferably includes a central axle section 82, opposite end axle sections 84, and adjustment cylinders 86. The central axle section 82 comprises a tubular body with opposite ends 88 and axle securement fasteners 90. End axle sections 84 include tubular axle portions 92, a cylindrical outer kingpin housing 94 attached to an end of the axle portion 92, and lateral weldment 96a (see FIGS. 6, 7, 9, 11, and 12). The kingpin housing 94 includes a lower flange 98 and presents a bore 100 that includes helical grooves to distribute lubricant between the housing and kingpin. The bores 100 define respective pivot axes P that correspond to axes of the kingpins 74a,76a (see FIGS. 9, 12, and 13). The kingpin housings 94 are arranged so that the pivot axes P angle outwardly in a downward direction. The illustrated end axle sections 84 preferably have a unitary construction.

The end axle sections 84 are preferably inserted through corresponding ends 88 of central axle section 82, and the sections 82,84 are telescopically interfitted. Adjustment cylinders 86 are mounted to weldment 102 of the central axle section 82 and are also mounted to lateral weldment 96a (see FIG. 7). In this manner, adjustment cylinders 86 are configured to telescopically shift the corresponding end axle section 84 into and out of the central axle section 82 to adjust the width of the front telescopic axle 72. In particular, the end axle sections 84 are slidably shiftable relative to the central axle section 82 between a laterally inner position (see FIGS. 3 and 4) and a laterally outer position (see FIGS. 5-12). Fasteners 90 are selectively engaged with the end axle sections 84 to position and restrict relative movement between sections 82,84. In this manner, the axle width can be selected by the operator (e.g., so that the lateral spacing of wheels 36 corresponds to spacing of crop rows in a field).

Figure 5:
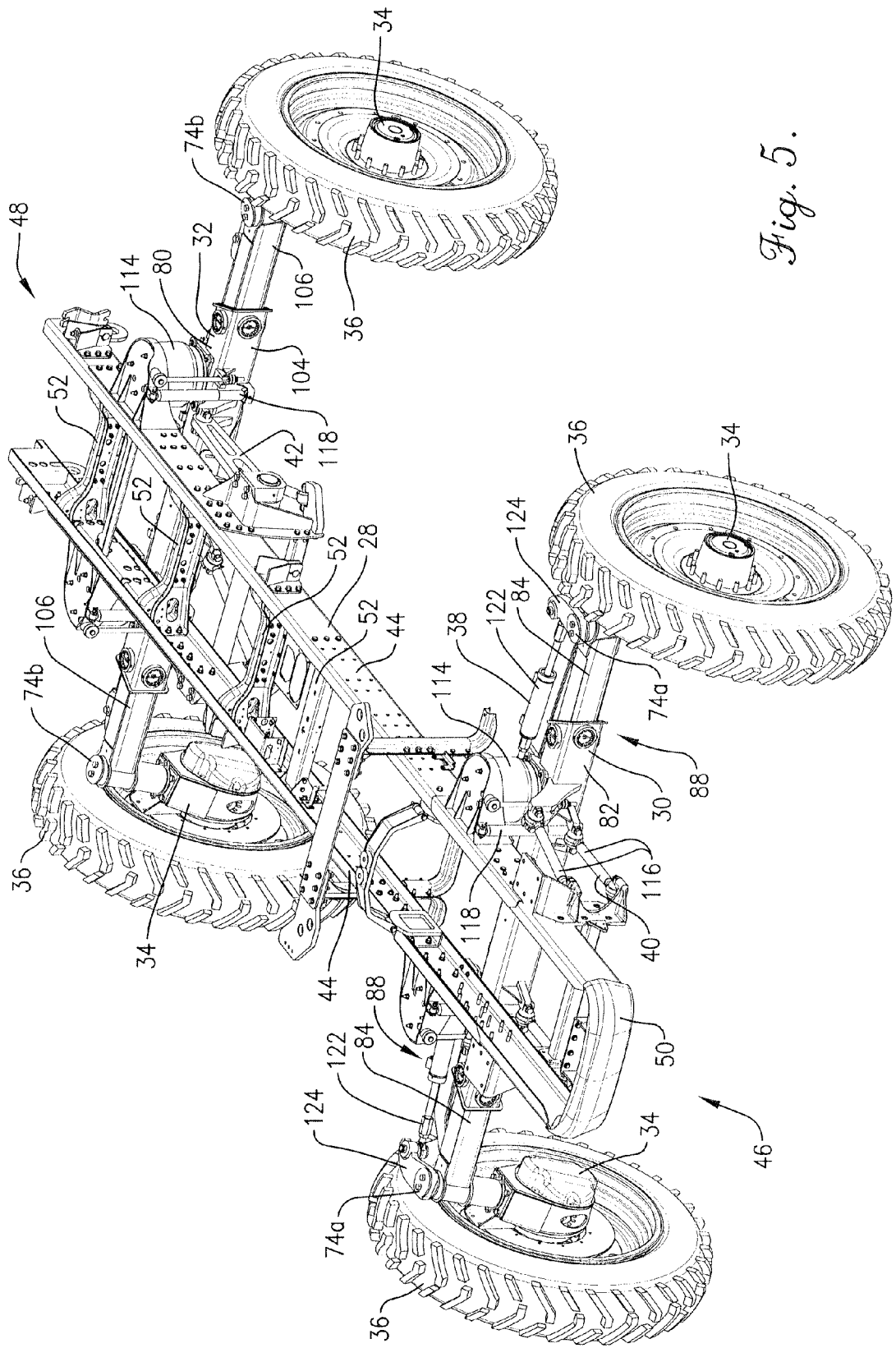
FIG. 5 is a front perspective of the rolling chassis similar to FIG. 4, but showing the end axle sections shifted laterally outwardly from the central axle sections so that the axle assemblies are in a laterally outer axle position.
Figure 6:
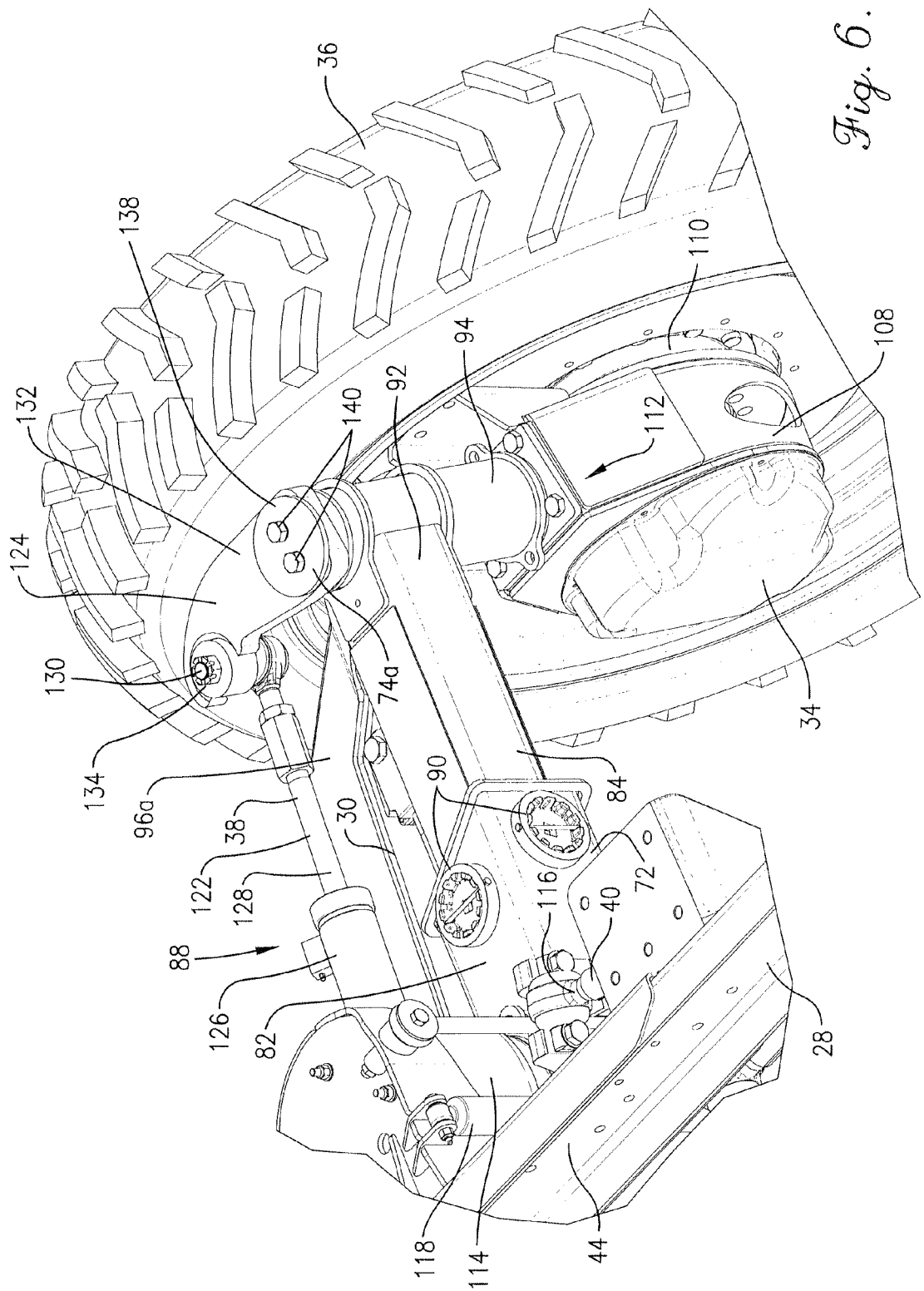
FIG. 6 is an enlarged fragmentary front perspective of the rolling chassis adjacent the left front wheel and front axle assembly, showing a steering assembly of the rolling chassis including a steering cylinder and pivot arm operably mounted to the front axle assembly to steer the front wheels.
Figure 7:
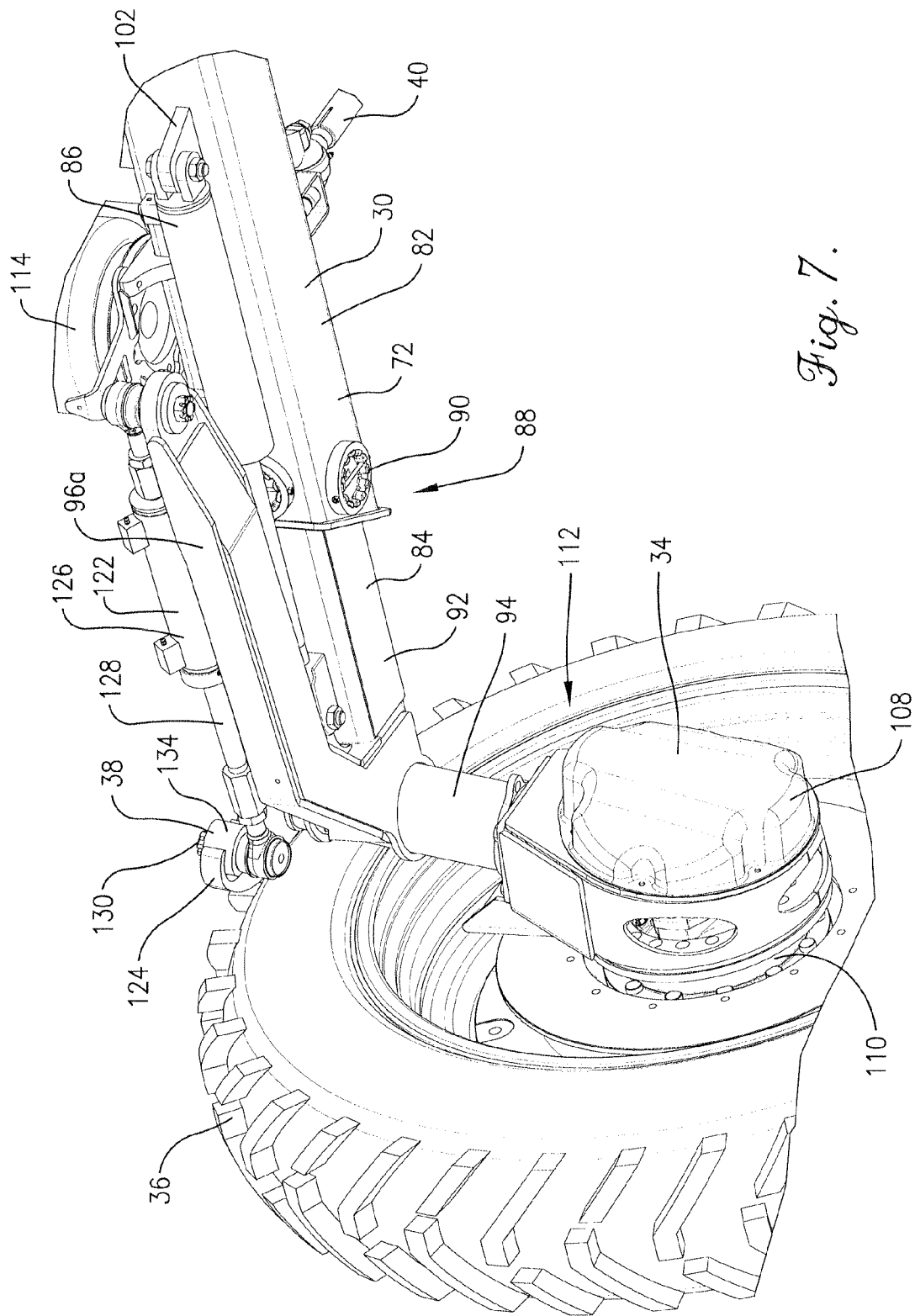
FIG. 7 is an enlarged fragmentary rear perspective of the rolling chassis adjacent the left front wheel and front axle assembly, showing a front adjustment cylinder connected to the central axle section and corresponding end axle section of the front axle assembly, with the front adjustment cylinder being operable to slide the end axle section into and out of the central axle section.
Figure 8:
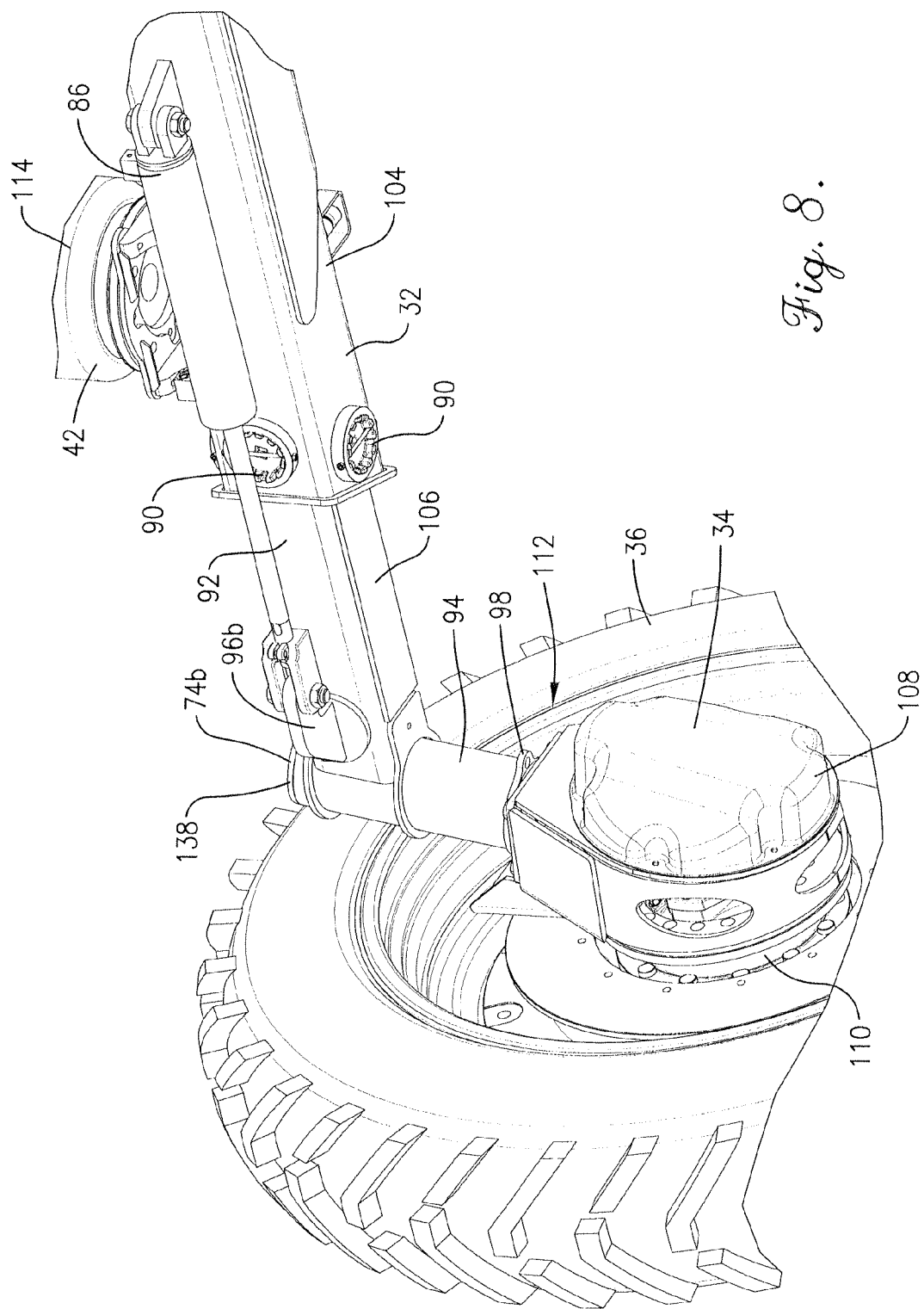
FIG. 8 is an enlarged fragmentary rear perspective of the rolling chassis adjacent the left rear wheel and rear axle assembly, showing a rear adjustment cylinder connected to the central axle section and corresponding end axle section of the rear axle assembly, with rear the adjustment cylinder being operable to slide the respective end axle section into and out of the central axle section.
Figure 10:
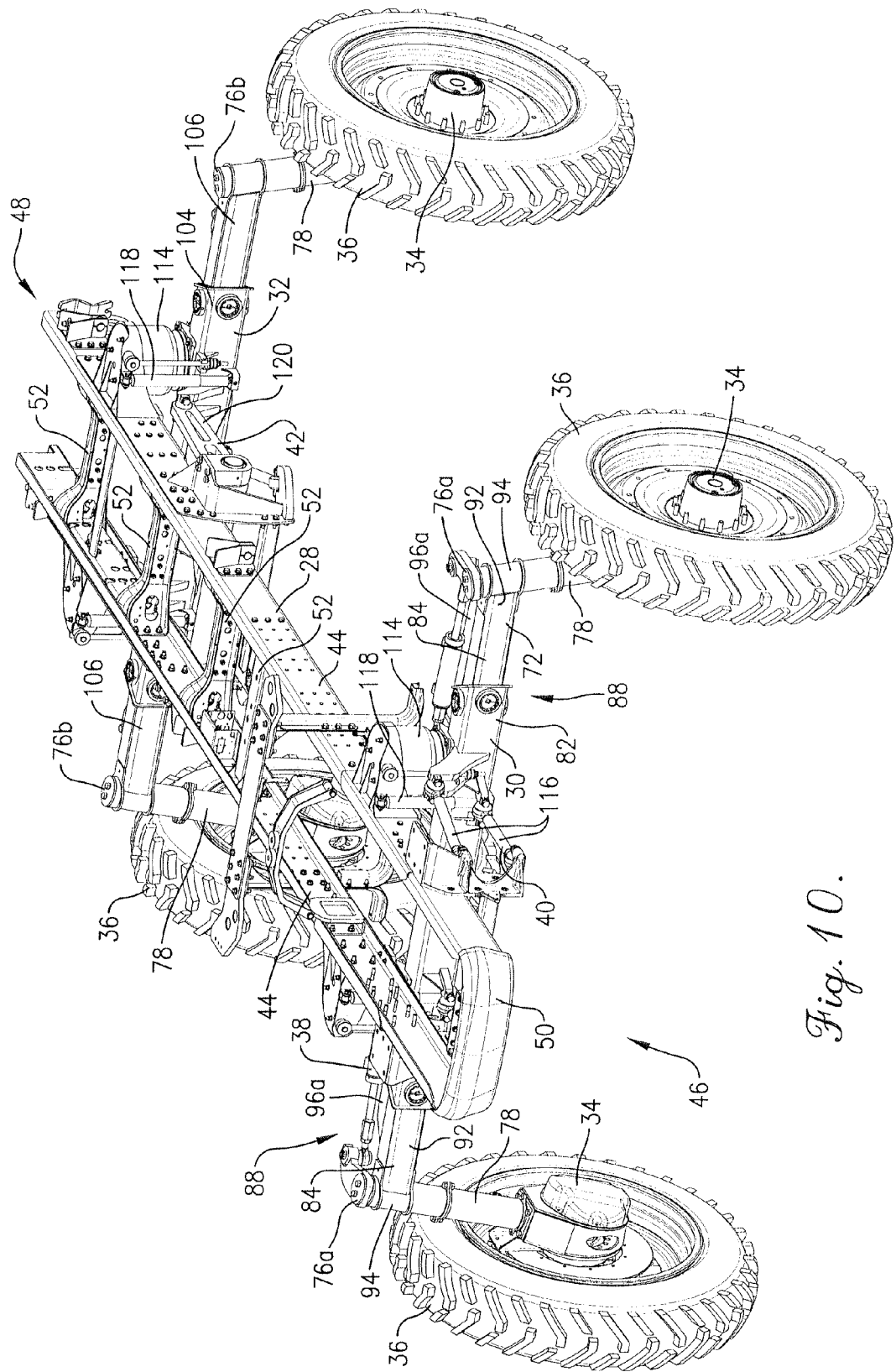
FIG. 10 is a front perspective of the rolling chassis shown in FIGS. 1-9, showing the rolling chassis in an elevated clearance configuration, with the axle assemblies including elongated kingpins and spacers that replace the standard kingpins to raise the axles from the standard clearance position to an elevated height position, and with the axle assemblies being in the outer axle position.

Turning to FIGS. 5, 8, and 10, rear telescopic axle 80 is similarly constructed to front telescopic axle 72. Rear telescopic axle 80 includes a central axle section 104 and end axle sections 106. End axle sections 106 include tubular axle portions 92, a cylindrical outer kingpin housing 94, and lateral weldment 96b (see FIG. 8). The kingpin housing 94 also defines respective pivot axes P that correspond to axes of the kingpins 74b,76b. The kingpin housing 94 is arranged so that the pivot axes P angle outwardly in a downward direction.

End axle sections 106 are preferably inserted through corresponding ends of central axle section 104, and the sections 104,106 are also telescopically interfitted. The rear telescopic axle 80 further includes adjustment cylinders 86 that are attached to corresponding weldments of the axle section 104 and weldments 96b. The rear adjustment cylinders 86 interconnect the central and end axle sections 104,106 to selectively adjust the width of the rear telescopic axle 80. Similar to front telescopic axle 72, adjustment cylinders 86 are configured to slidably shift the corresponding end axle section 106 into and out of the central axle section 104 to adjust the width of the rear telescopic axle 80. The end axle sections 106 are slidably shiftable relative to the central axle section 104 between a laterally inner position (see FIGS. 3 and 4) and a laterally outer position (see FIGS. 5, 8, and 10). Fasteners 90 are selectively engaged with the end axle sections 106 to restrict relative movement between sections 104,106. Thus, the axle width of rear telescopic axle 80 can also be selected by the operator.

It is also within the principles of the present invention where axles 72,80 are alternatively constructed to provide an adjustable width axle. For example, the axles 72,80 could be constructed such that the central and end axle sections are adjustably connected to each other but are not telescopically interfitted. As will be discussed in greater detail, axle width is adjustable between the inner and outer axle positions to maintain a predetermined lateral wheel spacing when adjusting axle clearance height and to permit other changes to the wheel spacing (e.g., to accommodate different crop row spacing).

Turning to FIGS. 6-9, each wheel hub assembly 34 receives the corresponding wheel 36 mounted thereon. The wheel hub assembly 34 includes a drive housing 108 and a driven hub 110 rotatably mounted on the housing 108. The housing 108 receives a motor (not shown) drivingly connected to the driven hub 110. The drive housing 108 presents a connection end 112 that attaches to the respective axle assembly 30,32. The illustrated applicator 20 is preferably powered by driving all four of the hubs 110 and wheels 36 (i.e., all-wheel drive operation), but it is also within the scope of the present invention where less than all of the wheels 36 are driven by a corresponding powered wheel hub.

The illustrated wheels 36 preferably include tires with a diameter dimension of about seventy (70) inches. However, the wheels 36 could use a larger or smaller tire, e.g., a tire with a diameter dimension of about eighty (80) inches, to further adjust the clearance of the applicator 20.

The illustrated axle assemblies 30,32 are preferably configured so that the wheels 36 have a slight camber (see FIGS. 13a and 13b). More preferably, the wheels 36 have a camber of about one (1) degree. The front axle assembly 30 is also preferably configured to present a small scrub radius, i.e., the distance along the ground between the pivot axis P and the contact patch of the corresponding wheel 36. More preferably, the scrub radius ranges from about one (1) inch to about two (2) inches. Furthermore, the scrub radius is preferably substantially the same when the axle assembly 30 is in either standard clearance configuration or the elevated clearance configuration. It is equally within the ambit of the present invention where the axle assemblies 30,32 are configured to have an alternative scrub radius. Furthermore, it is within the scope of the invention where wheels 36 are configured to present another suitable camber.

Figure 4:
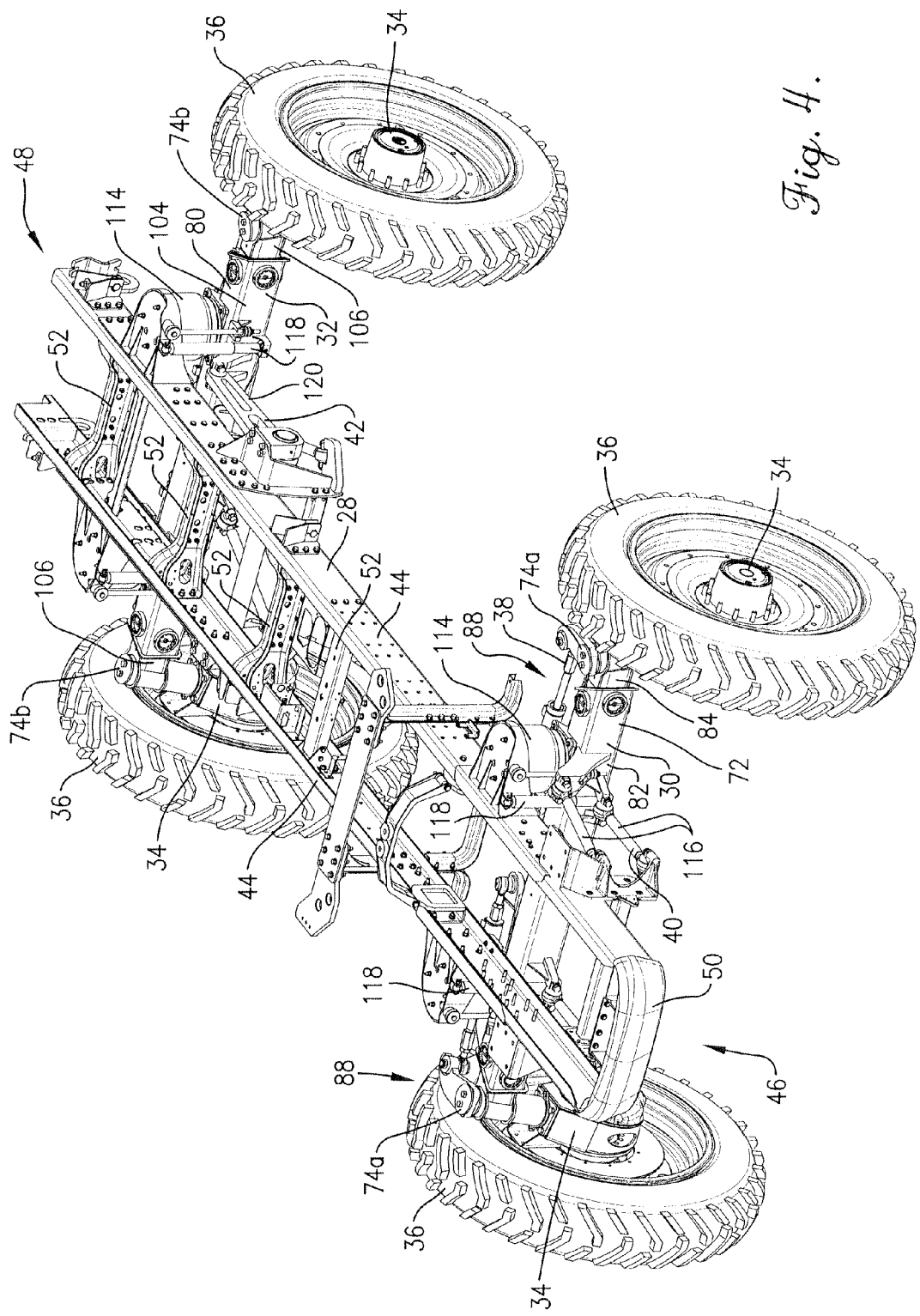
FIG. 4 is a front perspective of the rolling chassis shown in FIGS. 1-3, showing the axle assemblies in the laterally inner axle position.

Turning to FIGS. 4, 5, and 10, the ladder frame 28 is supported by front and rear suspensions 40,42. The front suspension 40 preferably includes, among other things, air springs 114, torque bars 116, and dampers 118 that interconnect a front portion of ladder frame 28 and front axle assembly 30. Rear suspension 42 preferably includes, among other things, air springs 114, dampers 118, and torque bars 120 that interconnect a rear portion of ladder frame 28 and rear axle assembly 32. In the usual manner, the illustrated suspensions 40,42 preferably control and dampen movement of the frame 28 relative to axle assemblies 30,32. However, it is also within the scope of the present invention where the suspensions 40,42 are alternatively configured to control and dampen movement of frame 28.

Turning again to FIGS. 4-9, the steering assembly 38 is preferably mounted on front axle assembly 30 and is operably coupled to front wheels 36 to control pivotal movement of the front wheels 36 relative to the frame 28. However, it is also within the scope of the present invention where the steering assembly 38 is alternatively or additionally coupled to back wheels 36 to pivot the back wheels 36 relative to the frame 28 and thereby provide steering of applicator 20. The illustrated steering assembly 38 preferably includes steering cylinders 122 and pivot arms 124. Each steering cylinder 122 includes a cylinder body 126, a piston 128, and a ball stud 130 pivotally attached to the distal end of piston 128 to form a ball joint. The illustrated steering cylinders 122 are preferably hydraulic cylinders. However, it is also within the scope of the present invention where the pivot arms are driven by another type of linear motor. The steering cylinder 122 is operably mounted to the axle assembly 30 by pivotally mounting one end of the body 126 to an innermost end of lateral weldment 96.

The pivot arm 124 includes a body 132 and bushing 134 attached to each other, and the bushings 134 each pivotally receive the respective ball stud 130. The body of pivot arm 124 presents a slot 136 that receives a complementally shaped end of the corresponding kingpin 74a,76a. As will be discussed, the kingpins 74,76 preferably include a plate 138 and fasteners 140 that secure the respective kingpin within the kingpin housing 94. The pivot arm 124 is secured to the kingpin 74a,76a by securing the plate 138 and fasteners 140 on top of the pivot arm 124. However, for some aspects of the present invention, the pivot arm 124 could be alternatively attached to corresponding kingpin 74a,76a such that rotation of the pivot arm 124 causes rotation of the kingpin. For example, the pivot arm 124 could be attached to a location between the ends of the kingpin 74a,76a.

With the ball stud 130 pivotally received by the bushing 134, movement of the piston 128 into and out of the body 126 results in rotation of the pivot arm 124 and kingpin 74a,76a about the respective pivot axis P (see FIG. 13a), which causes corresponding pivotal movement of the wheel hub assembly 34 and wheel 36. While the illustrated steering assembly 38 is preferred, it is also within the scope of the present invention where another steering mechanism is used to steer the wheels 36 of front axle assembly 30 while permitting adjustment of axle clearance and width.

Turning to FIGS. 4-9, the axle assemblies 30,32 are preferably adjustable between a standard clearance position associated with the standard clearance configuration (see FIGS. 1-9) and an elevated clearance position associated with the elevated clearance configuration (see FIGS. 10-12) while maintaining a predetermined lateral wheel spacing between each pair of front and rear wheels 36. The standard clearance position defines a standard height dimension D1 of the axle sections above the rotation axis of the wheel hubs 110, and the elevated clearance position defines an elevated height dimension D2 of the axle sections above the wheel hub rotation axis, with the elevated dimension D2 being greater than standard dimension D1 (see FIGS. 13a and 13b). Preferably, the difference between dimension D2 and dimension D1 ranges from about one (1) inch to about twenty (20) inches and, most preferably, is about ten (10) inches. As will be discussed in greater detail, the axle assemblies 30,32 preferably include the standard kingpin 74, the elongated kingpin 76, and spacer sleeve 78 for use with the elongated kingpin 76 to adjust the axle assemblies 30,32 between the configurations. It is also within the ambit of the present invention where axle assemblies 30,32 are adjustable between more than two clearance configurations.

Figure 9:
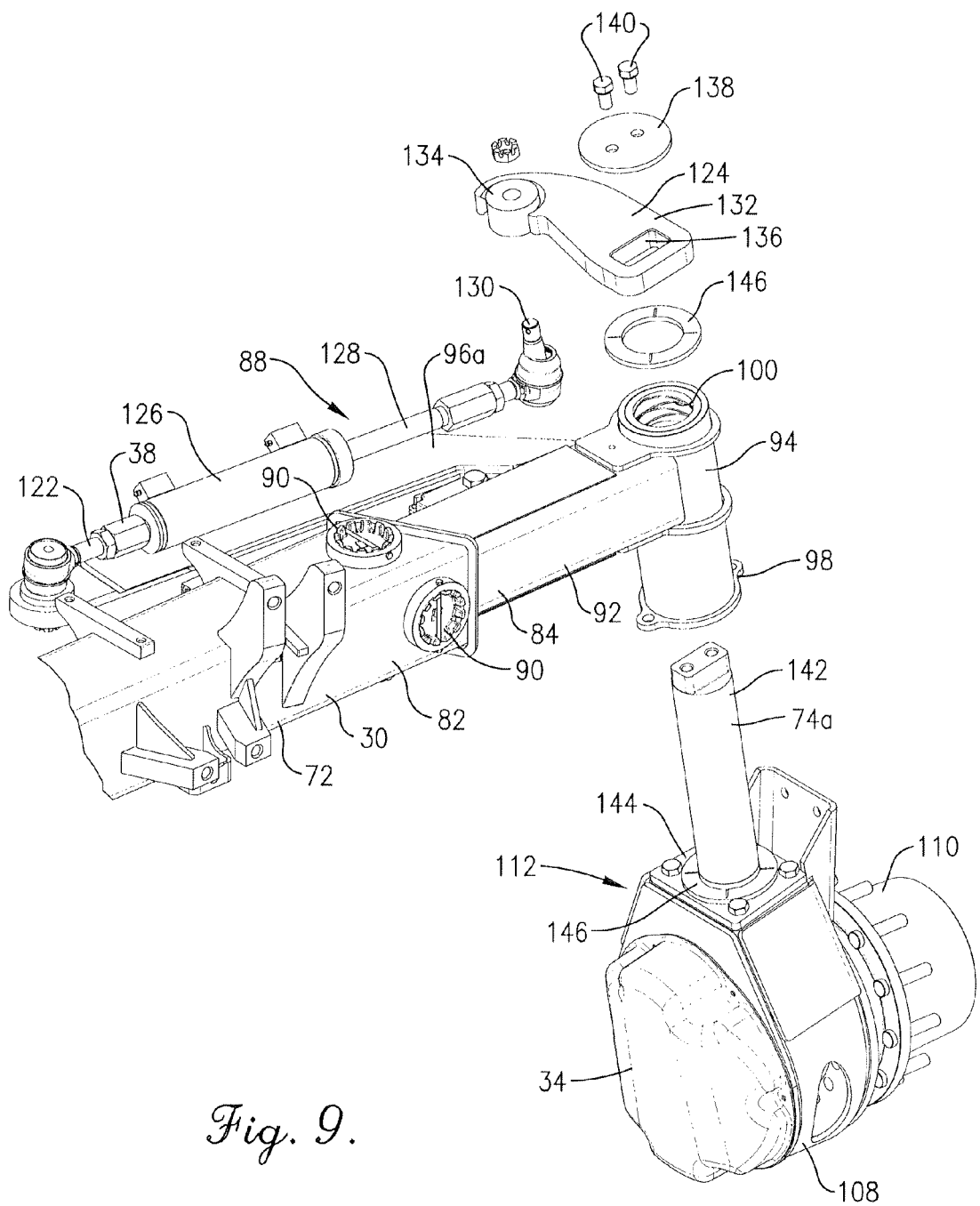
FIG. 9 is a partly exploded front perspective of the rolling chassis adjacent the left end of the front axle assembly, showing a standard kingpin of the front axle assembly and a pivot arm of the steering assembly being exploded from the corresponding end axle section and also exploded from the respective steering cylinder.

Turning to FIG. 9, the front and rear kingpins 74a,74b include a journal shaft 142 and a flange 144. The journal shaft 142 presents an upper end and a lower end attached to the flange 144 and also presents a standard length. The flanged lower end of each front kingpin 74a is removably attached to connection end 112 of the respective drive housing 108 so that rotation of the kingpin 74a causes corresponding swinging movement of the respective wheel hub assembly 34 and wheel 36. The journal shaft 142 is slidably inserted into the bore 100 of kingpin housing 94 and is rotatably mounted therein, with a washer 146 positioned between flange 98 of kingpin housing 94 and flange 144 of kingpin 74a, and another washer 146 positioned between an uppermost end of kingpin housing 94 and pivot arm 124. The upper end of the journal shaft 142 is notched and is inserted into slot 136 of the pivot arm 124, with the upper end being secured to the pivot arm 124 by plate 138 and fasteners 140. Thus, the front kingpin 74a and kingpin housing 94 cooperatively define a pivot joint that permits pivotal movement of the kingpin 74a about pivot axis P. Furthermore, the illustrated kingpin 74a drivingly interconnects the pivot arm 124 and the wheel hub assembly 34. Thus, driving lateral movement of the piston 128 of the steering cylinder 122 causes rotation of the kingpin 74a, and, in turn, causes swinging movement of the wheel hub assembly 34 and wheel 36. In the usual manner, the front kingpins 74a are preferably rotated by the steering assembly 38 so that the wheel hubs assemblies 34 and wheels 36 are swung generally in the same rotational direction at substantially the same time and rate to permit left and right steering of the applicator 20.

The rear kingpins 74b are operably connected to the rear telescopic axle 80 by removably attaching the flanged lower end of the kingpin 74b to connection end 112 of the respective drive housing 108. The journal shaft 142 of rear kingpin 74b is slidably inserted into the bore 100 that extends through the kingpin housing 94 of the rear telescopic axle 80. However, the journal shaft 142 of rear kingpin 74b is not rotatably mounted within the bore 100. Rather, the joint cooperatively defined by the rear kingpin 74b and kingpin housing 94 includes a construction (not shown) that restricts rotational movement of the kingpin 74b within the housing 94. Thus, the illustrated rear wheel hub assemblies 34 and wheels 36 are preferably restricted from any swinging movement. Each rear kingpin 74b is secured by a corresponding plate 138 and fasteners 140. In the illustrated embodiment, the standard kingpins 74a,74b are preferably installed to provide the standard clearance configuration of the axle assemblies 30,32. For some aspects of the present invention, the axle assemblies 30,32 could be configured to have the standard kingpins 74a,74b installed while in the elevated clearance configuration. As will be subsequently described, an extension member could be added to the upper end of the standard kingpin 74 so that the kingpin 74 and extension cooperatively provide an elongated kingpin.

Figure 11:
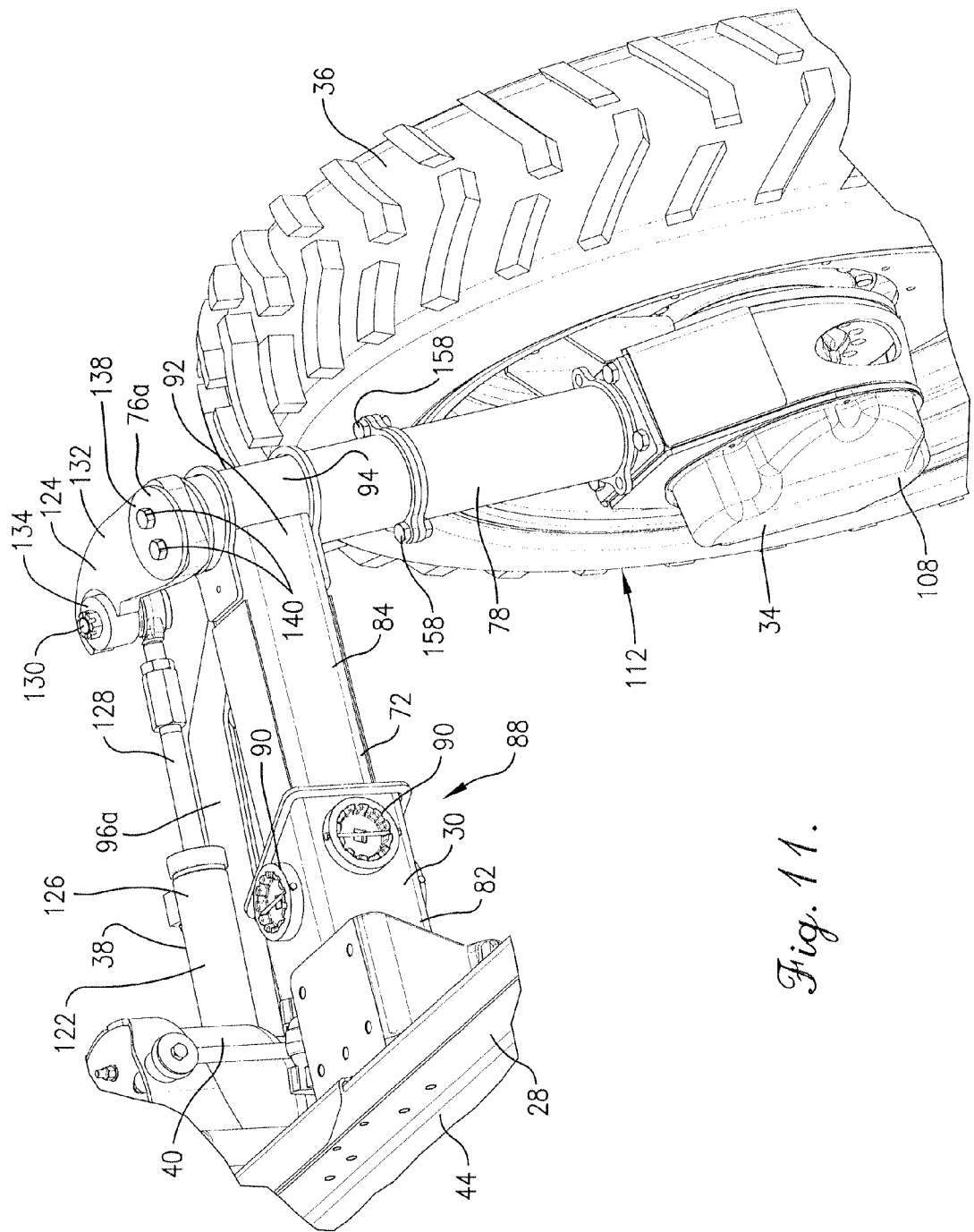
FIG. 11 is an enlarged fragmentary front perspective of the rolling chassis shown in FIG. 10, showing the front axle assembly adjacent the left front wheel, with the front axle assembly being in the elevated clearance configuration and the end axle section being shifted outwardly so that the axle assembly is in the outer axle position.
Figure 12:
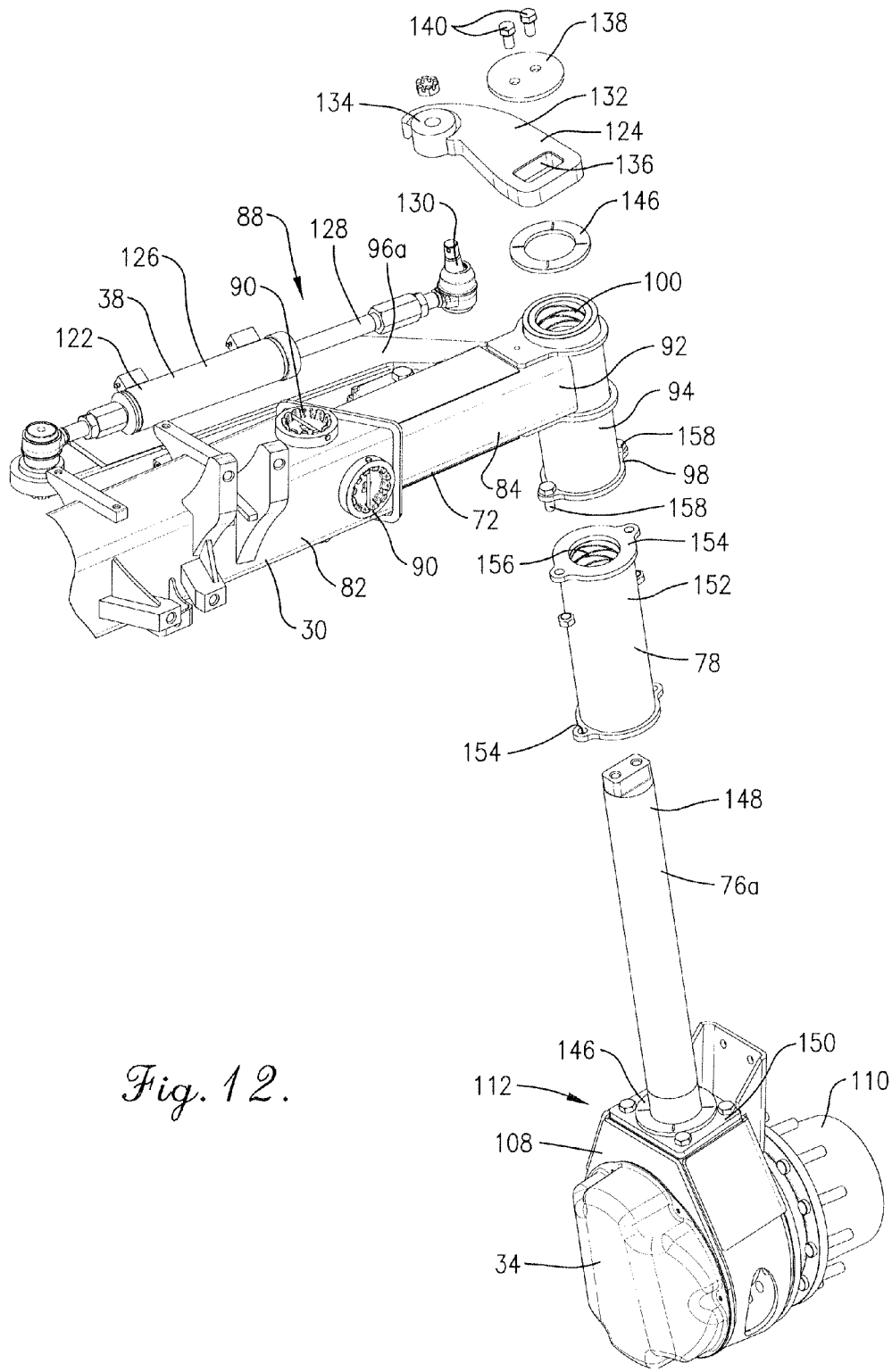
FIG. 12 is a partly exploded front perspective of the rolling chassis adjacent the left end of the front axle assembly, showing the elongated kingpin, spacer, and pivot arm exploded from the end axle section of the front axle assembly and from the steering cylinder.

Turning to FIGS. 10-12, the illustrated elongated kingpins 76a,76b and sleeves 78 are preferably installed in place of the standard kingpins 74a,74b to provide the elevated clearance configuration of the axle assemblies 30,32. The elongated kingpins 76a,76b include an extended journal shaft 148, which presents an extended length greater than a standard length of journal shaft 142, and a flange 150. Preferably, the extended length of journal shaft 148 ranges from about one and one-half (1.5) to about three (3) times longer than the standard length of journal shaft 142. More preferably, the extended length is about twice as long as the standard length. The journal shaft 148 presents an upper end and a lower end attached to the flange 150 (see FIG. 12), with the upper end of the front kingpins 76a being notched.

The sleeve 78 includes a cylindrical body 152 and flanges 154 on opposite ends, with a bore 156 extending through the body 152 and flanges 154. The illustrated sleeve 78 is preferably constructed with a sleeve length that corresponds approximately to the difference in length between the journal shafts 142,148. More preferably, the sleeve length ranges from about one-half (0.5) to about two (2) times the standard length of journal shaft 142 and, most preferably, is about the same length as journal shaft 142. The sleeve length also preferably corresponds approximately to the difference in height dimensions D1,D2.

The sleeve 78 is attached to the axle 72 and engages the kingpin housing 94 by attaching an upper one of the flanges 154 to flange 98 with fasteners 158. Thus, the bores 100,156 cooperatively present a continuous bore that rotatably receives the kingpin 76. While the illustrated axle assemblies 30,32 preferably include a single sleeve 78 associated with each kingpin 76a,76b, it is also within the scope of the present invention where multiple sleeves are associated with each of the kingpins 76a,76b and can be used in various sleeve combinations (e.g., to provide more than two axle clearance configurations).

The flanged lower end of front kingpin 76a is attached to the connection end 112 with fasteners. The journal shaft 148 is slidably inserted into bores 100,156 and is rotatably received within bores 100,156 so that rotation of the front kingpin 76a causes corresponding swinging movement of the respective wheel hub assembly 34 and wheel 36. The notched end of the journal shaft 148 is inserted into slot 136 and is secured to the respective pivot arm 124 by plate 138 and fasteners 140. Thus, the kingpin 76a and kingpin housing 94 cooperatively define a pivot joint that permits pivotal movement of the kingpins 76a about pivot axes P. Similar to kingpins 74a, the illustrated kingpins 76a drivingly interconnect the pivot arm 124 and the wheel hub assembly 34. Consequently, driving lateral movement of the piston 128 causes rotation of the kingpin 76a and swinging movement of the wheel hub assembly 34 and wheel 36. Thus, the elongated kingpin 76a and sleeve 78 permit steering of the front wheels 36 while providing the elevated clearance configuration of axle assemblies 30,32.

Similar to rear kingpins 74b, rear kingpins 76b are operably connected to the rear telescopic axle 80 by removably attaching the flanged lower end of the kingpin 76b to connection end 112 of the respective drive housing 108. The journal shaft 148 of rear kingpin 76b is slidably inserted into the bores 100,156 of kingpin housing 94 and sleeve 78. However, the journal shaft 148 of rear kingpin 76b is not rotatably mounted within the bore. Again, the joint cooperatively defined by the rear kingpin 76b and kingpin housing 94 preferably includes a mechanism (not shown) that restricts rotational movement of the kingpin 76b within the housing 94. Thus, the elongated kingpins 76a,76b are preferably installed to provide the elevated clearance configuration of the axle assemblies 30,32. The illustrated kingpins 76a,76b and sleeves 78 can be provided as either original equipment of the applicator 20 or as an aftermarket kit to be used with the applicator 20 to provide the elevated clearance. As will be discussed, the kingpins 74a, 74b are interchangeable with corresponding kingpins 76a, 76b to adjust clearance of the applicator 20.

By selectively attaching the standard kingpin 74 or the combination of the elongated kingpin 76 and sleeve 78, the axle assemblies 30,32 can be shifted between the clearance configurations. During the replacement process, the frame of chassis 22 is preferably supported by a suitable jack mechanism (not shown). In the illustrated embodiment, the axle assemblies 30,32 are preferably shifted from the standard clearance configuration to the elevated clearance configuration by initially detaching all of the standard kingpins 74 from the axle assemblies 30,32 (i.e., by detaching the front kingpins 74a from the corresponding pivot arms 124, end axle sections 84, and drive housings 108, and detaching the rear kingpins 74b from the corresponding end axle sections 84 and drive housings 108). However, for some aspects of the present invention, the standard kingpins 74 could remain attached to the axle assembly while converting the axle assembly to the elevated clearance configuration.

The standard kingpins 74 are then preferably replaced by the elongated kingpins 76 and sleeves 78. In particular, the sleeves 78 are preferably attached to corresponding kingpin housings 94 and the kingpins 76 are then preferably inserted into corresponding bores. However, it is also within the scope of the present invention where the kingpins 76 are first inserted into the bore 156 of the sleeve 78, and the sleeve 78 is then attached to the kingpin housing 94. The kingpins 76 are then preferably secured within the bores by attaching plates 138 and fasteners 140 to the upper ends of the journal shafts.

Similarly, the axle assemblies 30,32 can be returned from the elevated clearance configuration to the standard clearance configuration by replacing all of the elongated kingpins 76 and sleeves 78 with the standard kingpins 74. In particular, the elongated kingpins 76 are detached by removing the plates 138 and fasteners 140 from the upper end of the journal shafts and then removing the lower flanged ends from the connection ends 112. The sleeves 78 are also detached from the kingpin housing 94. The standard kingpins 74 are then attached to the respective wheel hub assemblies 34 and kingpin housings 94.

For some aspects of the present invention, the axle assemblies could be alternatively configured to be adjustable in height. Again, the illustrated axle assemblies 30,32 preferably include a single sleeve 78 associated with each kingpin 76, but it is also within the ambit of the present invention where multiple sleeves are associated with kingpins 76 so that the multiple sleeves can be attached to the kingpin housings 94 in one of various sleeve combinations (e.g., to provide more than two axle clearance configurations). Also, an alternative kingpin arrangement could be configured to provide axle height adjustment. For example, the standard kingpin 74 could remain attached to the drive housing 108 when the axle assembly is shifted into the elevated clearance configuration. In particular, an extension member (not shown) could be added to the upper end of the standard kingpin 74 so that the kingpin 74 and extension cooperatively provide an elongated kingpin that maintains the axle assembly in the elevated clearance configuration. Such an extension member would preferably include a journal shaft operable to be received by the corresponding kingpin housing 94. Furthermore, the extension member could be constructed to be removably mounted on the journal shaft 142. On the other hand, it is within the ambit of the present invention where the elongated kingpin 76 is used in both standard and elevated clearance configurations. For instance, the axle assemblies could be configured to shift from the elevated configuration to the standard configuration by shifting the elongated kingpins 76 upwardly so that the journal shaft 148 extends above the kingpin housing 94. In such a configuration, at least one of the pivot arms 124 and kingpin 76 would be modified from the illustrated configuration to permit attachment of the pivot arm at multiple locations along the length of the kingpin.

Turning to FIGS. 13a and 13b, in adjusting the applicator 20 between standard and elevated clearance configurations, a wheel spacing dimension S is preferably maintained substantially unchanged (e.g., so that the applicator 20 can be driven along the same crop rows in either configuration). In the illustrated embodiment, shifting of the applicator 20 from the standard clearance configuration to the elevated clearance configuration, without any other changes to the axle assemblies, results in the wheels 36 being spaced further apart. This occurs because the pivot axes P diverge from each other in a downward direction. Thus, the replacement of standard kingpins 74 with elongated kingpins 76 serves to shift the wheel hubs and wheels in a laterally outwardly direction.

With the applicator 20 being shifted into the elevated clearance configuration, the end axle sections 84 can be shifted laterally inwardly to return the wheels to the preselected wheel spacing dimension S. In other words, the axle width is preferably reduced in dimension when shifting the axles from the standard clearance to the elevated clearance. In the embodiment shown in FIG. 13a, the axle assembly 30 is in the standard clearance configuration and the end axle sections 84 are located at intermediate positions associated with the wheel spacing dimension S. The axle assembly 30 is then shifted to the elevated clearance configuration and the end axle sections 84 are shifted laterally inwardly from the intermediate positions to maintain the wheel spacing dimension S (see FIG. 13b). Of course, the wheel spacing dimension S is variable to the extent that the end axle sections 84 are shiftable relative to the central axle section 82. Furthermore, it is not necessary for the spacing to be maintained when the applicator is shifted between the standard and elevated clearance configurations.

In operation, the applicator 20 is shiftable between standard and elevated clearance configurations so that the applicator 20 can be driven through crop rows without damaging the crop. The applicator 20 can be shifted into the elevated clearance configuration by replacing the standard kingpins 74 with elongated kingpins 76 and spacer sleeves 78. Similarly, the applicator 20 can be returned to the standard clearance configuration by replacing the elongated kingpins 76 and spacer sleeves 78 with standard kingpins 74. In addition, the applicator 20 includes adjustable-width axle assemblies that permit the operator to select a predetermined wheel spacing. The axle assemblies also permit adjustment of the clearance configuration while maintaining the predetermined wheel spacing.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a self-propelled, dirigible agricultural vehicle, a height-adjustable chassis comprising:
an axle and a driven wheel hub, with the axle being shiftable between a normal clearance position above the wheel hub and a relatively higher elevated clearance position;
a kingpin presenting opposite upper and lower ends,
said kingpin being attached relative to the wheel hub adjacent the lower end,
said kingpin being attached relative to the axle adjacent the upper end,
said kingpin being rotatable relative to the axle about an upright kingpin axis so that the wheel hub swings as the kingpin rotates;
a steering mechanism coupled between the axle and wheel hub to effect swinging of the wheel hub; and
a spacer section removably connectable to the kingpin between the axle and the wheel hub, with the axle being in the normal clearance position when the spacer is removed and in the elevated clearance position when the spacer is connected between the axle and the wheel hub, and with the steering mechanism being operable to swing the wheel hub when the axle is in either of the positions.

2. The agricultural vehicle as claimed in claim 1,
said axle including a housing that pivotally receives the kingpin, with the housing and kingpin cooperatively providing a pivot joint.

3. The agricultural vehicle as claimed in claim 2,
said kingpin being adjustably secured to the housing and slidable along the kingpin axis into and out of an elevated clearance location associated with the elevated clearance position.

4. The agricultural vehicle as claimed in claim 3,
said spacer section being removably received on the kingpin between the housing and wheel hub to restrict the axle from shifting out of the elevated clearance position toward the normal clearance position.

5. The agricultural vehicle as claimed in claim 4,
said spacer section removably attached to the housing, with the kingpin being rotatably received within the spacer section.

6. The agricultural vehicle as claimed in claim 1,
said spacer section mounted above the lower end.

7. The agricultural vehicle as claimed in claim 6,
said spacer section slidably mounted on the kingpin.

8. The agricultural vehicle as claimed in claim 1,
said steering mechanism including a steering arm connected between the kingpin and axle.

9. The agricultural vehicle as claimed in claim 1,
said chassis including a pair of wheels rotatably mounted at opposite ends of the axle in a preselected wheel spacing that defines a lateral wheel spacing dimension when the axle is in the normal clearance position,
at least one of said wheels being shifted laterally inwardly from the preselected wheel spacing when the axle is shifted from the normal clearance position to the elevated clearance position.

10. The agricultural vehicle as claimed in claim 9,
said axle including a pair of axle sections that are each attached to a corresponding wheel,
said axle sections being shiftable relative to one another to permit the lateral wheel spacing to be varied and relocation of the wheels to the preselected wheel spacing when the axle is in the elevated clearance position.

11. An axle pivot kit operable to adjust the clearance between an axle and a driven wheel hub of a chassis of a self-propelled, dirigible agricultural vehicle, with the chassis including a removable original equipment kingpin pivotally mounted within a portion of the axle to maintain the axle in a normal clearance position above the wheel hub and further including a steering mechanism coupled between the axle and wheel hub to effect swinging of the wheel hub, said kit comprising:
a replacement kingpin presenting opposite upper and lower ends, with the replacement kingpin operable to be attached relative to the wheel hub adjacent the lower end and operable to be attached relative to the axle adjacent the upper end,
said replacement kingpin serving to replace the original equipment kingpin once the latter is removed, and being relatively longer than the original equipment kingpin,
said replacement kingpin being rotatable relative to the axle about an upright kingpin axis so that the wheel hub swings as the replacement kingpin rotates; and
a spacer section removably connectable to the replacement kingpin between the axle and the wheel hub, said spacer section removably coupled to the kingpin above the lower end and operable to engage the axle to locate the axle in an elevated clearance position, with the steering mechanism being operable to swing the wheel hub in either of the positions.

12. The axle pivot kit as claimed in claim 11,
said spacer section slidably mounted on the replacement kingpin.

13. The axle pivot kit as claimed in claim 12,
said spacer section comprising a sleeve that rotatably receives the replacement kingpin.

14. A method of adjusting the clearance between an axle and a driven wheel hub of a chassis of a self-propelled, dirigible agricultural vehicle, with the chassis including a removable original equipment kingpin attached relative to an axle housing and the wheel hub and being rotatable about an upright kingpin axis so that the wheel hub swings as the kingpin rotates, and with the original equipment kingpin maintaining the axle in a normal clearance position above the wheel hub, said method comprising the steps of:
   (a) inserting a replacement kingpin in the place of the original equipment kingpin between the axle and wheel hub along the kingpin axis; and
   (b) mounting a spacer section into engagement with the axle housing, with the spacer section maintaining the axle in an elevated clearance position located above the normal clearance position.

15. The method as claimed in claim 14,
step (a) including the step of rotatably mounting the replacement kingpin within the axle housing.

16. The method as claimed in claim 14; and
(c) detaching the original equipment kingpin from the axle before step (a).

17. The method as claimed in claim 16,
step (c) including the step of detaching the original equipment kingpin from the wheel hub, with the replacement kingpin replacing the original equipment kingpin.

18. The method as claimed in claim 16;
(d) removing the replacement kingpin and spacer section from the chassis; and
(e) attaching the original equipment kingpin to return the axle to the normal clearance position from the elevated clearance position.

19. The method as claimed in claim 14,
said chassis including wheels rotatably mounted adjacent opposite ends of the axle, with the wheels defining a preselected wheel spacing when in the normal clearance position,
steps (a) and (b) causing the wheel hub to be shifted laterally outwardly so that the wheels present a spacing in the elevated clearance position that is greater than the preselected wheel spacing; and
(c) shifting the axle housing laterally inwardly to return the wheels to the preselected wheel spacing.

* * * * *